US012593320B2

(12) United States Patent (10) Patent No.: US 12,593,320 B2
Dong (45) Date of Patent: Mar. 31, 2026

(54) COMMUNICATION METHOD AND COMMUNICATION DEVICE

(71) Applicant: Beijing Xiaomi Mobile Software Co., Ltd., Beijing (CN)

(72) Inventor: Xiandong Dong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 351 days.

(21) Appl. No.: 18/253,467

(22) PCT Filed: Nov. 27, 2020

(86) PCT No.: PCT/CN2020/132314
§ 371 (c)(1),
(2) Date: May 18, 2023

(87) PCT Pub. No.: WO2022/110035
PCT Pub. Date: Jun. 2, 2022

(65) Prior Publication Data
US 2024/0008013 A1 Jan. 4, 2024

(51) Int. Cl.
*H04W 72/0453* (2023.01)
*H04W 48/08* (2009.01)
*H04W 72/40* (2023.01)

(52) U.S. Cl.
CPC ....... *H04W 72/0453* (2013.01); *H04W 48/08* (2013.01); *H04W 72/40* (2023.01)

(58) Field of Classification Search
CPC ... H04W 72/0453; H04W 48/08; H04W 8/24; H04W 72/40; H04W 84/12
See application file for complete search history.

(56) References Cited

U.S. PATENT DOCUMENTS

| | | | |
|---|---|---|---|
| 2018/0288695 A1 | 10/2018 | Tchigevsky et al. | |
| 2019/0053311 A1* | 2/2019 | Cariou | H04W 76/15 |
| 2020/0389869 A1* | 12/2020 | Patil | H04B 17/318 |
| 2021/0006361 A1* | 1/2021 | Asterjadhi | H04W 74/0816 |
| 2021/0045175 A1* | 2/2021 | Huang | H04W 80/02 |
| 2021/0144778 A1* | 5/2021 | Cherian | H04W 12/08 |
| 2021/0204093 A1* | 7/2021 | D'Angelo | H04W 4/029 |
| 2021/0235255 A1* | 7/2021 | Ansari | H04W 76/14 |

(Continued)

FOREIGN PATENT DOCUMENTS

| | | |
|---|---|---|
| CN | 110868726 A | 3/2020 |
| CN | 111050335 A | 4/2020 |
| WO | WO 2020050773 A1 | 3/2020 |

OTHER PUBLICATIONS

Extended European Search Report Issued in Application No. 20962925.2 dated Jun. 27, 2024, 10 pages.

(Continued)

*Primary Examiner* — Brian D Nguyen
(74) *Attorney, Agent, or Firm* — Finnegan, Henderson, Farabow, Garrett & Dunner, L.L.P.

(57) ABSTRACT

A communication method is performed by a first device, and includes: determining and transmitting a first message frame, wherein the first message frame includes information for indicating that the first device that transmits the first message frame supports a soft access function; and receiving a second message frame, wherein the second message frame includes frequency band information supported by a second device around the first device.

19 Claims, 2 Drawing Sheets

(56) References Cited

U.S. PATENT DOCUMENTS

| 2021/0282063 A1* | 9/2021 | Khoury | ................. | H04W 36/38 |
| 2022/0078727 A1* | 3/2022 | Chennichetty | ........ | H04L 5/0055 |
| 2023/0262768 A1* | 8/2023 | Ko | ........................ | H04W 76/15 |
| 2023/0262772 A1* | 8/2023 | Li | ......................... | H04L 1/1621 |
| | | | | 370/329 |
| 2023/0284303 A1* | 9/2023 | Ko | ....................... | H04W 48/12 |
| | | | | 370/310 |

OTHER PUBLICATIONS

International Search Report and Written Opinion of International Application No. PCT/CN2020/132314, mailed Aug. 17, 2021, 16 pages.

* cited by examiner receiving a first message frame ⌇310 transmitting a second message ⌇320 establishing a BSS ⌇330 performing communication ⌇340 communication apparatus 400

| processing module 410 | transmitting module 420 | receiving module 430 |

COMMUNICATION METHOD AND COMMUNICATION DEVICE

CROSS-REFERENCE TO RELATED APPLICATION

This application is a national phase of International Application No. PCT/CN2020/132314, filed on Nov. 27, 2020, the entire content of which is incorporated herein by reference.

TECHNICAL FIELD

The disclosure relates to the field of communications, and more specifically to, a communication method and a communication device in a wireless communication.

BACKGROUND

In practical applications, various types of stations (STAs) may exist simultaneously in a network, such as a STA for supporting high throughput (HT) communication (hereinafter referred to as a "HT STA"), a STA for supporting high efficiency (HE) communication (hereinafter referred to as a "HE STA"), a STA for supporting very high throughput (VHT) communication (hereinafter referred to as a "VHT STA") and/or a STA for supporting extreme high throughput (EHT) communication (hereinafter referred to as a "EHT STA"). When the EHT STA may work as a soft access point (Soft AP), it may communicate with various STAs in the network.

SUMMARY

A communication method is provided according to the disclosure. The communication method is performed by a first device and includes: determining and transmitting a first message frame, in which the first message frame includes information for indicating that the first device that transmits the first message frame supports a soft access function; and receiving a second message frame, in which the second message frame includes frequency band information supported by a second device around the first device.

A communication method is provided according to the disclosure. The communication method is performed by a second device and includes: receiving a first message frame, in which the first message frame includes information for indicating that a first device that transmits the first message frame supports a soft access function; and transmitting a second message frame, in which the second message frame includes frequency band information supported by the second device around the first device.

An electronic device is provided according to the disclosure. The electronic device includes a memory, a processor and a computer program stored on the memory and executable on the processor. When the processor executes the computer program, the above method is performed.

A computer-readable storage medium is provided according to the disclosure. The computer-readable storage medium has stored with a computer program thereon. When the computer program is executed by a processor, the above method is achieved.

BRIEF DESCRIPTION OF THE DRAWINGS

Example embodiments of the disclosure will be described below in detail with reference to the accompanying drawings, in which.

DETAILED DESCRIPTION

The following description with reference to the accompanying drawings is provided to fully understand the various embodiments of the disclosure as defined by the appended claims and their equivalents. The various embodiments of the disclosure include various specific details, but such specific details are considered to be exemplary only. In addition, descriptions of well-known techniques, functions and constructions may be omitted for the sake of clarity and brevity.

Terms and words used in the disclosure are not limited to written meanings, but are used by inventors to enable a clear and consistent understanding of the disclosure. Therefore, for those skilled in the art, the description of various embodiments of the disclosure is provided only for the purpose of illustration, but not for the purpose of limitation.

It should be understood that "a", "an", "said", and "the" in singular forms used herein can also include plural forms, unless clearly indicated in the context otherwise. It should be further understood that the word "include" used in the disclosure refers to the existence of described features, integers, steps, operations, elements, and/or assemblies, but does not exclude the existence or addition of one or more other features, integers, steps, operations, elements, assemblies, and/or groups thereof.

It will be understood that although the terms "first" and "second" and the like can be used herein to describe various elements, these elements should not be limited by these terms. These terms are only used to distinguish one element from another. Therefore, a first element discussed below may be referred to as a second element without departing from the teaching of the embodiments.

It should be understood that when an element is referred to as being "connected" or "coupled" to another element, it may be directly connected or coupled to other elements, or intervening elements may also exist. In addition, as used herein, "connected" or "coupled" may include wireless connection or wireless coupling. The term "and/or" or the expression "at least one of . . . " used herein includes any and all combinations of one or more related listed items.

Unless otherwise defined, all terms used herein, including technical terms and scientific terms, have the same meaning as generally understood by those skilled in the art to which this disclosure belongs.

Figure 1:
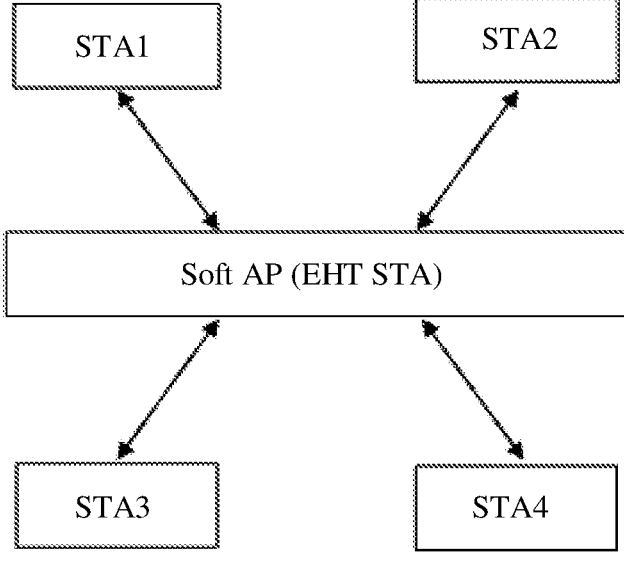
FIG. 1 is an exemplary diagram illustrating a wireless communication scenario according to some embodiments of the disclosure.

FIG. 1 is an exemplary diagram illustrating a wireless communication scenario according to some embodiments of the disclosure.

As illustrated in FIG. 1, there may be a plurality of STAs in a wireless local area network. An EHT STA as a Soft AP may communicate with other STAs (for example, STAs 1 to 4). Each of STAs 1 to 4 may be an HT STA, an HE STA, a VHT STA or an EHT STA. However, it may be understood that it is only illustrated by taking the HT STA, the HE STA, the VHT STA or the EHT STA for an example and is not a limitation of the scope of embodiments of the disclosure. For example, the STA for supporting other communication capabilities is included in the scope of the disclosure. In addition, although a description of embodiments is made by taking the EHT STA as the Soft AP, it is not limited in the disclosure. For example, the HE STA may be taken as the Soft AP. As an example, the STAs may be various devices for wireless communication, such as cellular phones, smart phones, wearable devices, computers, personal digital assistants (PDAs), personal communication system (PCS) devices, personal information managers (PIMs), personal navigation devices (PNDs), global positioning systems, multimedia devices, Internet of Things (IoT) devices and the like.

In the IEEE802.11be standard, a mechanism for supporting operations of a non-synchronous transmission/reception access point (Non-STR AP) multi-link device (MLD) is defined. The Non-STR AP MLD indicates that the AP MLD may transmit or receive simultaneously in a plurality of links, that is, the AP MLD may only receive simultaneously or only transmit simultaneously, or not receive and transmit simultaneously. The mechanism is limited to using a Non-STR Non-AP MLD as the Soft AP that utilizes all its links. For example, the EHT STA in FIG. 1 may be taken as the Non-STR Soft AP MLD. For the convenience of description, the Non-STR Soft AP MLD may be used interchangeably with the Soft AP.

In the embodiments, links supported by the Soft AP may be described as a basic link set and conditional link(s). In detail, in the basic link set, the Non-STR Soft AP MLD may transmit and receive frames simultaneously with other MLDs in paired links. As an example, paired links in the basic link set may include {2.4 Ghz link, 5 GHz link} or {2.4 GHz link, 6 GHz link}. In addition, in the conditional link(s) and some links in the basic link set, the Non-STR Soft AP MLD may not transmit and receive frames simultaneously with other MLDs. These links in the basic link set may be referred to as corresponding basic links for the conditional links. For example, if {2.4 GHz link, 5 GHz link} is the basic ink set, the 6 GHz link is the conditional link corresponding to the 5 GHz link.

For example, an HE STA (supporting 2.4 GHz, 5 GHz and 6 GHz), a VHT STA (supporting 2.4 GHz and 5 GHz) and an EHT STA (supporting 2.4 GHz, 5 GHz and 6 Ghz) may exist in a wireless communication and the EHT STA may work as the Soft AP, so that the EHT STA working as the Soft AP may communicate with the VHT STA and may communicate with the HE STA and/or other EHT STAs (not as the STA of the Soft AP). For example, since the VHT STA works in a 5 Ghz frequency band and a 2.4 Ghz frequency band, the EHT STA working as the Soft AP may only communicate with the VHT STA in the 2.4 Ghz or 5 Ghz frequency band. However, the Soft AP may communicate with the HE STA and/or other EHT STAs in the 2.4 Ghz, 5 Ghz and 6 Ghz frequency bands. When the EHT STA working as the Soft AP establishes a basic service set (BSS) in the 2.4 Ghz or 5 Ghz frequency band first, the HE STA and/or other EHT STAs may only access the EHT STA as the Soft AP in 2.4 Ghz or 5 Ghz and may not establish a BSS with the EHT STA as the Soft AP in the 6 Ghz frequency band (assume that an interference is small and a bandwidth is large), resulting in a waste of the 6 Ghz frequency band. For this purpose, a communication method is provided in embodiments of the disclosure, which may improve a frequency spectrum utilization rate and a throughput.

In all embodiments of the disclosure, it is illustrated by taking the 2.4 Ghz, 5 Ghz and 6 Ghz frequency bands as an example. However, it needs to be noted that, the frequency bands are only illustrative, rather than a limitation of the scope of the embodiments of the disclosure. In embodiments of the disclosure, frequency bands supported by different standards are not limited; and a frequency band of any value is within the protection scope of the embodiments of the disclosure.

Figure 2:
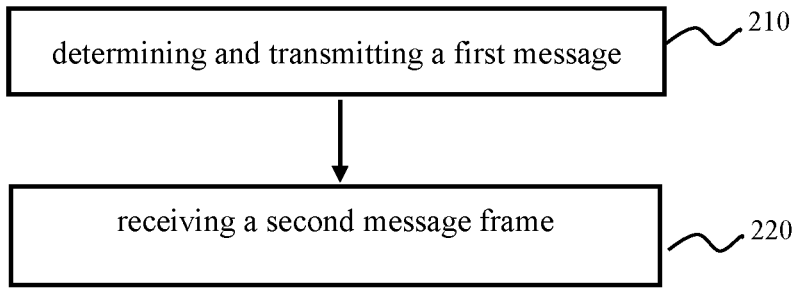
FIG. 2 is a flowchart illustrating a communication method according to some embodiments of the disclosure.

FIG. 2 is a flowchart illustrating a communication method according to some embodiments of the disclosure. The method in FIG. 2 is applicable to the EHT STA as the Soft AP as illustrated in FIG. 1 (it may be referred to as the "Soft AP" below for conciseness).

As illustrated in FIG. 2, at step 210, a first message frame may be determined and transmitted. The first message frame may include information for indicating that a first device (that is, the EHT STA as the Soft AP) that transmits the first message frame supports a soft access function. The information that supports the soft access function is located in an EHT capability information element of the first message frame.

In embodiments of the disclosure, there are many ways for determining the first message frame. For example, the Soft AP may generate the first message frame based on at least one of: a network condition, a load condition, a hardware capability of a transmitting/receiving device, a service type and a related protocol provision, which are not specifically limited in the embodiments of the disclosure. In embodiments of the disclosure, the Soft AP may obtain the first message frame from an external device, which is not specifically limited in embodiments of the disclosure.

In embodiments of the disclosure, the first message frame may be a probe request frame, a multi-link (ML) probe request frame, an association request frame or a re-association request frame. However, it is only illustrative and is not limited to embodiments of the disclosure.

In embodiments of the disclosure, when the EHT STA supports the Soft AP function, it may be broadcasted in the probe request frame, the ML probe request frame, the association request frame or the re-association request frame.

At step 220, a second message frame may be received. The second message frame may include frequency band information supported by a second device around the first device. In embodiments of the disclosure, the first device may correspond to the Soft AP as illustrated in FIG. 1 and the second device may correspond to each of STAs 1 to 4 as illustrated in FIG. 1. For example, the second message frame may be a response frame of the probe request frame, the ML probe request frame, the association request frame or the re-association request frame that is transmitted by the first device, which is not limited in the disclosure. For example, the second message frame may be any of various management frames, control frames and data frames from the STAs around the Soft AP, which will not be limited in the disclosure.

The Soft AP may collect the frequency band information supported by the surrounding STA via the second message frame. In detail, when the second message frame is received from the surrounding STA, the Soft AP may determine the frequency band information supported by the corresponding STA from the second message frame. In some embodiments, the frequency band information supported by the second device is determined based on capability information of the second message frame. As an example, the capability information may include at least one of: HT capability information; VHT capability information; HE capability information; and EHT capability information. The Soft AP may preliminarily determine which criteria is supported by the corresponding STA from the capability information of the second message frame, thereby preliminarily determining the frequency band information that may be supported by the corresponding STA.

In some embodiments, the frequency band information supported by the second device is determined based on a frequency band identity (ID) field of the second message frame. For example, the second message frame may include a band ID element and the Soft AP may determine the frequency band that may be supported by the corresponding STA based on the band ID field in the band ID element in the second message frame from each STA.

According to embodiments of the disclosure, the EHT STA as the Soft AP may collect the frequency band information supported by the surrounding STA. In detail, the EHT station as the Soft AP may parse an HT capability information element for the HT STA, may parse a VHT capability information element for the VHT STA, and may parse an HE capability information element for the HE STA; and may parse an EHT capability information element for other EHT STAs; or parse the band ID field in the band ID element of each STA, which are shown in Table 1 below.

TABLE 1

| Band ID Field | |
| --- | --- |
| Band ID Value | Meaning |
| 0 | TV white space |
| 1 | Sub-1 Ghz (in addition to TV white space) |
| 2 | 2.4 GHZ |
| 3 | 3.6 GHz |
| 4 | 4.9 and 5 GHz |
| 5 | 60 GHz |
| 6 | 45 GHZ |
| 7 | 6 GHZ |
| 8-255 | Reserved |

In Table 1, if the STA is the HE STA or the EHT STA, the band ID value of 7 may be configured to identify that the STA supports the 6 Ghz frequency band. It may be understood that, each value in Table 1 is only illustrative, rather than a limitation of embodiments of the disclosure.

When the Soft AP collects the frequency band information supported by the surrounding STA, the Soft AP may establish a BSS based on the collected frequency band information.

Although not shown, according to embodiments of the disclosure, the communication method illustrated in FIG. 2 may further include: classifying the second device based on the frequency band information; and establishing respectively by the first device BSSs with the second device or establishing respectively by the first device Ad-Hoc networks with the second device, in different frequency bands based on a classification result. As an example, the Soft AP may transmit a beacon frame in a corresponding frequency band to establish the BSS or the Ad-Hoc with the second device. However, it is merely an exemplary description that the BSS or the Ad-Hoc is established by means of the beacon frame, which will not be limited in the disclosure. In the following, embodiments are described mainly by establishing the BSS. However, embodiments related to establishing the BSS is also applicable to establishing the Ad-Hoc network, which will be omitted for conciseness.

In embodiments of the disclosure, the Soft AP may classify the second device based on the capability information and/or the band ID field included in the second message frame. For example, the Soft AP may perform a coarse classification on the second device based on the capability information included in the second message frame, and if the second message frame further includes the band ID field, the Soft AP may further perform a fine classification on the second device based on the band ID field.

According to embodiments of the disclosure, there is no out-of-band interference between different frequency bands of the BSSs. For example, based on the principle that there is no out-of-band interference between a 2.4 GHz frequency band and a 5 GHz frequency band or between a 2.4 GHz frequency band and a 6 GHz frequency band, the Soft AP may establish respectively the BSSs by transmitting the beacon frame in the 2.4 GHz frequency band and the 5 GHz frequency band or may establish respectively the BSSs by transmitting the beacon frame in the 2.4 GHz frequency band and the 6 GHz frequency band.

According to embodiments of the disclosure, the communication method illustrated in FIG. 2 may further include: in response to the second device supporting a 2.4 Ghz frequency band and a 5 Ghz frequency band, establishing respectively by the first device BSSs with the second device in the 2.4 Ghz frequency band and the 5 Ghz frequency band.

According to embodiments of the disclosure, the communication method illustrated in FIG. 2 may further include: in response to the second device supporting a 2.4 Ghz frequency band and a 6 Ghz frequency band, establishing respectively by the first device BSSs with the second device in the 2.4 Ghz frequency band and the 6 Ghz frequency band.

In some embodiments, the Soft AP classifies the collected frequency band information supported by pre-11be STAs (for example, the HT STA, the HE STA and the VHT STA) into one type, for example, supporting 2.4 GHz, 5 GHz or 6 GHz frequency bands. In the embodiments, the Soft AP divides the pre-11be STAs into a first-type STA supporting the 2.4 GHz frequency band and the 5 GHz frequency band or a second-type STA supporting the 2.4 GHz frequency band and the 6 GHz frequency band; and the Soft AP establishes BSSs with the first-type STA in the 2.4 GHz frequency band and the 5 GHz frequency band, and the Soft AP establishes BSSs with the second-type STA in the 2.4 GHz frequency band and the 6 GHz frequency band. For example, the Soft AP may receive the second message frame from the VHT STA; classify the VHT STA as the first-type STA based on the frequency band information included in the second message frame; establish the BSSs with the VHT STA in the 2.4 GHz frequency band and the 5 GHz frequency band respectively and communicate with the VHT STA via the BSS of the 2.4 GHz frequency band and the BSS of the 5 GHz frequency band. For example, the Soft AP may receive the second message frame from the HE STA; classify the HE STA as the second-type STA based on the frequency band information included in the second message frame; establish the BSSs with the HE STA in the 2.4 GHz frequency band and the 6 GHz frequency band respectively and communicate with the HE STA via the BSS of the 2.4 GHz frequency band and the BSS of the 6 GHz frequency band.

In some embodiments, the Soft AP classifies the collected frequency band information supported by the EHT STA into a type, and for example, supporting 2.4 GHz and 5 GHz frequency bands, or 2.4 GHz, 5 GHz and 6 GHz frequency bands. For example, the Soft AP may receive the second message frame from the EHT STA; classify the EHT STA as the STA that supports 2.4 GHz and 5 GHz frequency bands based on the frequency band information included in the second message frame; establish BSSs with the EHT STA in the 2.4 GHz frequency band and the 5 GHz frequency band respectively and communicate with the EHT STA via the BSS of the 2.4 GHz frequency band and the BSS of the 5 GHz frequency band. For example, the Soft AP may receive the second message frame from the EHT STA; classify the EHT STA as the STA that supports 2.4 Ghz, 5 Ghz and 6 GHz frequency bands based on the frequency band information included in the second message frame; establish BSSs with the EHT STA in the 2.4 GHz frequency band, the 5 GHz frequency band and the 6 GHz frequency band respectively and communicate with the EHT STA via the BSS of the 2.4 GHz frequency band, the BSS of the 5 GHz frequency band and the BSS of the 6 GHz frequency band. If three BSSs (2.4/5/6 GHz) are established, the simultaneous communication may be performed in the 2.4 GHz frequency band and the 5 GHz frequency band; and the simultaneous communication may be performed in the 2.4 GHz frequency band and the 6 GHz frequency band, and the time-division communication may be performed in the 5 GHz frequency band and the 6 GHz frequency band.

In some embodiments, the communication method as illustrated in FIG. 2 may further include: in response to establishing respectively by the first device basic service sets with the second device in a 2.4 Ghz frequency band, a 5 Ghz frequency band and a 6 Ghz frequency band, performing communication by:

performing simultaneous communication by the first device and the second device in the 2.4 GHz frequency band and the 5 GHz frequency band; or performing simultaneous communication by the first device and the second device in the 2.4 GHz frequency band and the 6 GHz frequency band; or performing time-division communication by first device and second device in the 5 Ghz frequency band and the 6 Ghz frequency band.

In addition, although not shown, according to embodiments of the disclosure, the communication method as illustrated in FIG. 2 may further include: establishing by the first device a basic service set with the second device based on a number of basic service sets in each frequency band. In some embodiments, the Soft AP may determine a number of BSSs in each frequency band based on the frequency band information collected at step 220 and establish the BSS based on the number of BSSs in each frequency band. For example, when there are three overlapping basic service sets (OBSSs) between the first device and the second device in the 2.4 Ghz frequency band and there are two OBSSs in the 5 Ghz frequency band, the first device may select to establish the BSS with the second device in the 5 Ghz frequency band.

In some embodiments of the disclosure, the EHT STA (supporting the Soft AP function) establishes a BSS that performs simultaneous communication or time-division communication in different links based on the band ID information collected at step 210, which is as follows.

1. The Soft AP classifies the collected frequency band information supported by the pre-11be STA into a type, for example, supporting 2.4 GHz, 5 GHz or 6 GHz frequency band; and classifies the collected frequency band information supported by the EHT STA into a type, for example, supporting 2.4 GHz and 5 GHz frequency bands, or 2.4 GHz, 5 GHz and 6 GHz frequency bands; based on the principle that there is no out-of-band interference between the 2.4 GHz frequency band and the 5 GHz frequency band or between the 2.4 GHz frequency band and the 6 GHz frequency band, the EHT STA (supporting the Soft AP function) may establish BSSs by transmitting the beacon frame in the 2.4 GHz and the 5 GHz frequency band respectively, or may establish BSSs by transmitting the beacon frame in the 2.4 GHz frequency band and the 6 GHz frequency band respectively.

2. Basic conditions for establishing 2.4 GHz, 5 GHz or 6 GHz BSSs

A BSS may be established based on a number of BSSs in each frequency band. However, a first principle is to build two non-interfering BSSs (capable of receiving and transmitting simultaneously in two links).

If three BSSs (2.4/5/6 GHz) are established, the simultaneous communication may be performed in the 2.4 GHz and 5 GHz frequency bands or the 2.4 GHz and the 6 GHz frequency band; and the time-division communication may be performed in the 5 and 6 GHz frequency bands.

Figure 3:
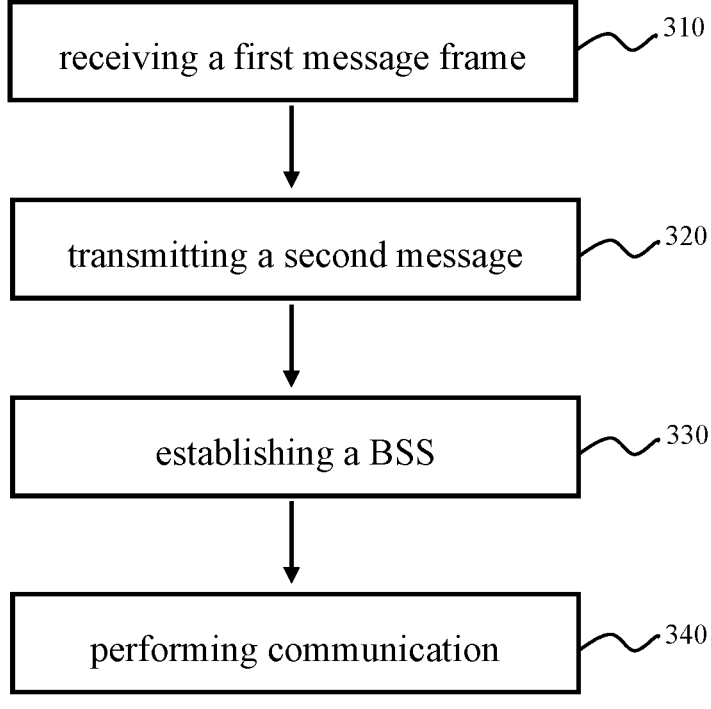
FIG. 3 is a flowchart illustrating another communication method according to some embodiments of the disclosure.

FIG. 3 is a flowchart illustrating another communication method according to some embodiments of the disclosure. The communication method in FIG. 3 is applicable to each of STAs 1 to 4 as illustrated FIG. 1 (referred to as a "second device").

As illustrated in FIG. 3, at step 310, a first message frame may be received. The first message frame may be determined and transmitted by a Soft AP. The first message frame may include information for indicating that a first device that transmits the first message frame supports a soft access function. The information that supports the soft access function is located in an EHT capability information element of the first message frame.

At step 320, a second message frame may be transmitted. When the second device receives the first message frame from the first device and needs to access the first device, the second device may transmit the second message frame in response to the first message frame. The second message frame includes frequency band information supported by the second device around the first device.

According to embodiments, the frequency band information supported by the second device is included in capability information of the second message frame. According to embodiments, the capability information may include at least one of:

HT capability information;
VHT capability information;
HE capability information; and
EHT capability information.

According to embodiments, the frequency band information supported by the second device is included in a frequency band identity field in the second message frame. The frequency band information at step 320 may be similar to embodiments as illustrated FIG. 2, which will be omitted for conciseness.

At step 330, the second device establishes respectively BSSs with the first device in different frequency bands. For example, the first device may classify the second device based on the frequency band information and transmit a beacon frame to the second device in a corresponding frequency band based on the classification result; the second device transmits an association request frame to the first device when receiving the beacon frame; and the first device feeds back an association response frame to the second device, thereby establishing the BSS.

In some embodiments, in response to the second device supporting a 2.4 GHz frequency band and a 5 GHz frequency band, the second device establishes BSSs with the first device respectively in the 2.4 GHz frequency band and the 5 GHz frequency band.

In some embodiments, in response to the second device supporting the 2.4 GHz frequency band and the 6 GHz frequency band, the second device establishes BSSs with the first device respectively in the 2.4 GHz frequency band and the 6 GHz frequency band.

In some embodiments, the second device establishes a BSS with the first device based on a number of BSSs in each frequency band.

At step 340, communication may be performed. In some embodiment, in response to establishing by the second device basic service sets with the first device in the 2.4 Ghz frequency band, the 5 Ghz frequency band and the 6 Ghz frequency band, communication may be performed by:

> performing simultaneous communication by the first device and the second device in the 2.4 GHz frequency band and the 5 GHz frequency band; or
>
> performing simultaneous communication by the first device and the second device in the 2.4 GHz frequency band and the 6 GHz frequency band; or
>
> performing time-division communication by first device and second device in the 5 Ghz frequency band and the 6 Ghz frequency band.

In all steps as illustrated in FIG. 3, a description similar to corresponding embodiments as described in FIG. 2 is omitted for conciseness.

Figure 4:
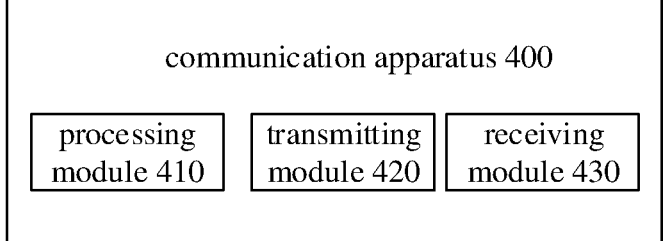
FIG. 4 is a block diagram illustrating a communication apparatus according to some embodiments of the disclosure.

FIG. 4 is a block diagram illustrating a communication apparatus according to some embodiments of the disclosure.

As illustrated in FIG. 4, a communication apparatus 400 may include a processing module 410, a transmitting module 420 and a receiving module 430. The communication apparatus 400 is applicable to the Soft AP as illustrated in FIG. 1 or STAs 1 to 4.

When the communication apparatus 400 is a device applied to the Soft AP, the processing module 410 may be configured to determine a first message frame. The transmitting module 420 may be configured to transmit the first message frame. The first message frame includes information for indicating that a first device that transmits the first message frame supports a soft access function. The receiving module 430 may be configured to receive a second message frame. The second message frame includes frequency band information supported by a second device around the first device. In this case, the communication apparatus 400 may perform the communication method as illustrated in FIG. 2, which will be omitted for conciseness.

When the communication apparatus 400 is a device applied to each of STA1 to a STA4, the receiving module 430 may be configured to receive a first message frame. The first message frame includes information for indicating that a first device that transmits the first message frame supports a soft access function. The processing module 410 may be configured to determine a second message frame. The transmitting module 420 is configured to transmit a second message frame. The second message frame includes frequency band information supported by a second device around the first device. In this case, the communication apparatus 400 may perform the communication method as illustrated in FIG. 3, which will be omitted for conciseness.

In addition, the communication apparatus 400 as illustrated in FIG. 4 is only illustrative, which will not be limited in embodiments of the disclosure. For example, the communication apparatus 400 may further include other modules, for example, a memory module. In addition, modules in the communication apparatus 400 may be combined into a more complex module or may be divided into more independent modules, to support various functions.

The communication method provided in embodiments of the disclosure may avoid a waste of frequency spectrum resources and improve a frequency spectrum utilization rate and a throughput.

Based on the same principles as the method provided in embodiments of the disclosure, the embodiments of the disclosure also provide an electronic device. The electronic device includes a processor and a memory having machine readable instructions (which may also be referred to as "a computer program") stored thereon. When the machine readable instructions are executed by the processor, the method described with reference to FIG. 2 and FIG. 3 is implemented.

The embodiments of the disclosure also provide a computer-readable storage medium having a computer program stored thereon. When the computer program is executed by a processor, the method described with reference to FIG. 2 and FIG. 3 is achieved.

In some embodiments, the processor may be a logic box, a module, or a circuit, for implementing or executing various embodiments described in the disclosure, for example, a central processing unit (CPU), a general processor, a digital signal processor (DSP), an application specific integrated circuit (ASIC), a field programmable gate array (FPGA) or other programmable logic devices, a transistor logic device, a hardware component, or any combination thereof. The processor may also be a combination used to implement a computing function, for example, a combination consisting of one or more microprocessors, and a combination consisting of DSPs and microprocessors.

In some embodiments, the memory may be, for example, a read only memory (ROM), a random access memory (RAM), an electrically erasable programmable read only memory (EEPROM), a compact disc read only memory (CD-ROM) or other optical disc memories, optical disk memories (including compact disc, laser disc, CD-ROM, digital general disc, and Blu-ray disc), disk storage mediums or other magnetic storage devices, or any other medium that can be used to carry or store program codes in the form of instructions or data structures and can be accessed by a computer, which is not limited herein.

It should be understood that although steps in the flowchart of the accompanying drawings are shown sequentially as indicated by the arrows, the steps are not necessarily performed sequentially in the order indicated by the arrows. Unless explicitly stated otherwise in the disclosure, there is no strict sequential limitation on the execution of these steps, which may be performed in any other order. In addition, at least some of the steps in the flowchart of the accompanying drawings may include a plurality of sub-steps or a plurality of phases, which are not necessarily executed at the same time, but may be executed at different times. The execution order is not necessarily sequential, and the steps can be performed alternately or alternatively with other steps or at least part of sub-steps or phases of other steps.

Although the disclosure has been shown and described with reference to the embodiments of the disclosure, it will be understood by those skilled in the art that various changes in form and detail can be made without departing from the scope of the disclosure. Accordingly, the scope of the disclosure should not be limited by the embodiments, but should be defined by the appended claims and their equivalents.

What is claimed is:

1. A communication method, performed by a first device, the method comprising:

determining and transmitting a first message frame, wherein the first message frame comprises information for indicating that the first device that transmits the first message frame supports a soft access function;

receiving a second message frame, wherein the second message frame comprises frequency band information supported by a second device around the first device;

classifying the second device based on the frequency band information; and establishing basic service sets with the second device in different frequency bands, respectively, based on a classification result.

2. The method of claim 1, wherein the frequency band information supported by the second device is determined based on capability information of the second message frame.

3. The method of claim 2, wherein the capability information comprises at least one of:

high throughput (HT) capability information;

very high throughput (VHT) capability information;

high efficiency (HE) capability information; and extreme high throughput (EHT) capability information.

4. The method of claim 1, wherein the frequency band information supported by the second device is determined based on a frequency band identity field of the second message frame.

5. The method of claim 1, further comprising: in response to the second device supporting a 2.4 Ghz frequency band and a 5 Ghz frequency band, establishing basic service sets with the second device in the 2.4 Ghz frequency band and the 5 Ghz frequency band, respectively.

6. The method of claim 1, further comprising: in response to the second device supporting a 2.4 Ghz frequency band and a 6 Ghz frequency band, establishing basic service sets with the second device in the 2.4 Ghz frequency band and the 6 Ghz frequency band, respectively.

7. The method of claim 1, further comprising:

establishing a basic service set with the second device based on a number of basic service sets in each frequency band.

8. The method of claim 1, further comprising:

in response to establishing basic service sets with the second device in a 2.4 Ghz frequency band, a 5 Ghz frequency band and a 6 Ghz frequency band, respectively, performing communication by:

performing simultaneous communication by the first device and the second device in the 2.4 GHz frequency band and the 5 GHz frequency band; or performing simultaneous communication by the first device and the second device in the 2.4 GHz frequency band and the 6 GHz frequency band; or performing time-division communication by the first device and the second device in the 5 Ghz frequency band and the 6 Ghz frequency band.

9. A communication method, performed by a second device, the method comprising:

receiving a first message frame, wherein the first message frame comprises information for indicating that a first device that transmits the first message frame supports a soft access function; and transmitting a second message frame, wherein the second message frame comprises frequency band information supported by the second device around the first device;

wherein the frequency band information is used for the first device to classify the second device and to establish basic service sets with the second device in different frequency bands, respectively, based on a classification result.

10. The method of claim 9, wherein the frequency band information supported by the second device is comprised in capability information of the second message frame.

11. The method of claim 10, wherein the capability information comprises at least one of:

high throughput (HT) capability information;

very high throughput (VHT) capability information;

high efficiency (HE) capability information; and extreme high throughput (EHT) capability information.

12. The method of claim 9, wherein the frequency band information supported by the second device is comprised in a frequency band identity field of the second message frame.

13. The method of claim 12, further comprising:

establishing basic service sets with the first device in different frequency bands, respectively.

14. The method of claim 13, further comprising: in response to the second device supporting a 2.4 Ghz frequency band and a 5 Ghz frequency band, establishing basic service sets with the first device in the 2.4 Ghz frequency band and the 5 Ghz frequency band, respectively.

15. The method of claim 13, further comprising: in response to the second device supporting a 2.4 Ghz frequency band and a 6 Ghz frequency band, establishing basic service sets with the first device in the 2.4 Ghz frequency band and the 6 Ghz frequency band, respectively.

16. The method of claim 9, further comprising:

establishing a basic service set with the first device based on a number of basic service sets in each frequency band.

17. The method of claim 9, further comprising:

in response to establishing basic service sets with the first device in a 2.4 Ghz frequency band, a 5 Ghz frequency band and a 6 Ghz frequency band, respectively, performing communication by:

performing simultaneous communication by the first device and the second device in the 2.4 GHz frequency band and the 5 GHz frequency band; or performing simultaneous communication by the first device and the second device in the 2.4 GHz frequency band and the 6 GHz frequency band; or performing time-division communication by the first device and the second device in the 5 Ghz frequency band and the 6 Ghz frequency band.

18. A second device, comprising:

a processor; and a memory storing a computer program executable by the processor, wherein the processor is configured to perform the method of claim 9.

19. A first device, comprising:

a processor; and a memory storing a computer program executable by the processor, wherein the processor is configured to:

determine and transmit a first message frame, wherein the first message frame comprises information for indicating that the first device that transmits the first message frame supports a soft access function;

receive a second message frame, wherein the second message frame comprises frequency band information supported by a second device around the first device;

classify the second device based on the frequency band information; and establish basic service sets with the second device in different frequency bands, respectively, based on a classification result.

* * * * *